United States Patent [19]

Hasegawa et al.

[11] 4,332,931
[45] Jun. 1, 1982

[54] PROCESS FOR PRODUCING UNSATURATED POLYESTER

[75] Inventors: Takashi Hasegawa, Kawanishi; Minoru Miki, Kobe; Yutaka Taniguchi, Amagasaki, all of Japan

[73] Assignee: Takeda Chemical Industries, Ltd., Osaka, Japan

[21] Appl. No.: 252,602

[22] Filed: Apr. 9, 1981

[30] Foreign Application Priority Data

Apr. 22, 1980 [JP] Japan .................................. 55-53927

[51] Int. Cl.³ .............................................. C08G 63/42
[52] U.S. Cl. .................................... 528/297; 525/444; 525/445; 528/304
[58] Field of Search ................ 528/297, 304, 444, 445

[56] References Cited

U.S. PATENT DOCUMENTS 4,029,848  6/1977  Nelson .................................. 528/304
4,233,432  11/1980  Curtis .................................. 528/298

Primary Examiner—Lucille M. Phynes
Attorney, Agent, or Firm—Wenderoth, Lind & Ponack

[57] ABSTRACT

Unsaturated polyester is produced by reacting dicarboxylic acid anhydride with alkylene oxide in the presence of a reaction product of dicarboxylic acid and dicyclopendadiene. The unsaturated polyester thus obtained gives a cured polyester resin having well balanced properties of mechanical strength and boiling-water resistance.

11 Claims, No Drawings

PROCESS FOR PRODUCING UNSATURATED POLYESTER

The present invention relates to a process for producing unsaturated polyesters, which comprises reacting dicarboxylic acid anhydride with alkylene oxide in the presence of a reaction product of dicarboxylic acid and dicyclopentadiene.

The methods generally conducted into practice so far for production of unsaturated polyesters include one in which dicarboxylic acid or its acid anhydride is reacted with glycol while eliminating the resulting condensation water, but there are lately proposed the methods of synthesizing unsaturated polyesters from dicarboxylic acid anhydride and alkylene oxide. In such methods, normally, the esterification caused by an addition reaction proceeds in the presence of compounds having active hydrogen referred to as the reaction initiator. For example, there are known the production processes for unsaturated polyesters involving the addition of dicarboxylic acid anhydrides and alkylene oxides to polyhydric alcohols such as ethylene glycol, glycerin, trimethylolpropane and pentaerythritol or dicarboxylic acids such as succinic acid, phthalic acid, isophthalic acid and terephthalic acid, that are utilized as the reaction initiator (for example, Japanese Published Examined Patent Application No. 8271/1973, etc.). However, such production processes for polyesters yield polyesters in which ether linkages formed by the consecutive reaction of several alkylene oxides, in addition to ester linkages, are inevitably present, and presenting such disadvantages as tacky surface and inferior boiling-water resistance of molded articles obtained by curing unsaturated polyester resin compositions containing said polyesters, though they possess such advantages over the condensation reaction as no production of condensation water, lower reaction temperature and shorter reaction time.

The present inventors, after intensive investigation on the production process for unsaturated polyesters being free from such defects, found that the unsaturated polyesters obtained by allowing dicarboxylic acid anhydride to react with alkylene oxide in the presence of a reaction product of dicarboxylic acid and dicyclopentadiene as the reaction initiator, when they are cured, provide particularly excellent properties in terms of non-tackiness on surface and boiling-water resistance of molded articles, which culminated in the present invention.

The improved processes known so far for producing unsaturated polyesters by way of a condensation reaction include the method (Japanese Published Examined Patent Application No. 10825/1970) in which a partially esterified dicyclopentadienecarboxylic acid obtained for example by the reaction between dicyclopentadiene and maleic acid at a temperature of not higher than 150° C. is reacted with polyhydric alcohols, such as ethylene glycol, propylene glycol and dipropylene glycol, if necessary, with dibasic acids such as fumaric acid and adipic acid in order to produce low-shrink unsaturated polyesters. The unsaturated polyesters obtained by the process according to the present invention have excellent physical properties in terms of, for example, mechanical strength such as elongation, toughness and Charpy impact strength, as compared with the unsaturated polyesters obtained by the above-mentioned method, and, whereas the said method based on the condensation process is accompanied by, azeotropically or otherwise, the condensation water and low-molecular-weight compounds or decomposition products derived from dicyclopentadiene, etc. and, for its commercial application, requires complex facilities for eliminating these bad-smelling by-products, the process of the present invention provides the commercially, highly favored production process which permits the above-mentioned unsaturated polyesters having markedly excellent physical properties to be produced in simplified facilities with the use of raw materials available at exceedingly low prices.

Thus, the present invention relates to a process for producing an unsaturated polyester, which comprises reacting a dicarboxylic acid anhydride with an alkylene oxide in the presence of a reaction product of dicarboxylic acid and dicyclopentadiene.

The reaction product of dicarboxylic acid and dicyclopentadiene can be obtained by the reaction of both starting materials at a temperature ranging from about 80° to 160° C., preferably 100° to 130° C., for a period of about 0.5 to 10 hours, preferably 0.5 to 4 hours, As the dicarboxylic acid, used is made of $\alpha$, $\beta$-unsaturated diabasic acids such as maleic acid, fumaric acid, itaconic acid and citraconic acid, and saturated dibasic acids such as succinic acid, adipic acid, phthalic acid and isophthalic acid. These compounds can be used solely or as a suitable mixture thereof. In addition, anhydrides of these dibasic acids can be used, where the equivalent amount of water is to be employed in combination. Among these dicarboxylic acids, the particularly preferred starting materials include maleic acid, phthalic acid, isophthalic acid or a mixture thereof, maleic acid or a mixture of maleic acid and phthalic acid being most preferable. In place of these, an equivalent mixture of maleic anhydride and water can be used as well. The reaction of dicarboxylic acid and dicyclopentadiene generally proceeds in the absence of a solvent, and is carried out either in the presence of, or in the absence of, acid catalyst such as sulfuric acid and a Lewis acid. In the case of maleic acid being utilized as a starting material, for example, the reaction proceeds smoothly even when no acid catalyst is added. The ratio of a dicarboxylic acid to dicyclopentadiene to be utilized as the starting materials may be employable in the range from the equimolar proportion to double the equimolar proportion of either one of these components to the other, preferably from the equimolar proportion to 1.3 times the equimolar proportion. Even when either one of the two starting materials in used in excess amount, the resulting product can be subjected to the reaction between dicarboxylic acid anhydride and alkylene oxide. Acid value of the reaction product varies with the types of starting materials and their amounts used and, normally, the reaction products having acid value within the range of 100 to 300 mg KOH/g can be suitably employed.

These reaction products can be employed in the proportion of 2 parts to 200 parts, preferably 10 parts to 150 parts, against 100 parts of the total weight of dicarboxylic acid anhydrides and alkylene oxides.

The unsaturated polyesters of the present invention are produced by reacting dicarboxylic acid anhydrides with alkylene oxides in the presence of the reaction products of dicarboxylic acids and dicyclopentadiene as obtained by the above-mentioned procedure.

The dicarboxylic acid anhydrides which can be utilized in the present invention include $\alpha$,$\beta$-unsaturated dicarboxylic acid anhydrides such as maleic anhydride, itaconic anhydride and citraconic anhydride, preferably maleic anhydride, or dicarboxylic acid anhydrides other than α,β-unsaturated dicarboxylic acid anhydrides such as phthalic anhydride, tetrahydrophthalic anhydride, tetrachlorophthalic anhydride, tetrabromophthalic anhydride, 3,6-endo-methylene-tetrahydrophthalic anhydride, methyltetrahydrophthalic anhydride, 3,6-endodichloromethylene-tetrachlorophthalic anhydride, hexahydrophthalic anhydride, succinic anhydride and glutaric anhydride as well as substituted succinic anhydride derivatives typified by pentadodecylsuccinic anhydride, preferably phthalic anhydride. Among these dicarboxylic acid anhydrides, the most frequently used is a mixture of α,β-unsaturated dicarboxylic acid anhydride and dicarboxylic acid anhydride other than the α,β-unsaturated dicarboxylic acid anhydride, exemplified by the mixture of maleic anhydride and phthalic anhydride. In the case of saturated dicarboxylic acid being employed as one of the materials of the reaction initiator as mentioned above, it is essential to employ α,β-unsaturated dicarboxylic acid anhydride, whereas in the case of α,β-unsaturated dicarboxylic acid anhydride such as maleic anhydride being employed, sole use of dicarboxylic acid anhydride other than α,β-unsaturated dicarboxylic acid anhydride may be sufficient for attaining the purpose.

As the alkylene oxide, use can be made of alkylene oxiides such as ethylene oxide, propylene oxide, butylene oxide and styrene oxide, and substituted alkylene oxides such as epichlorohydrin and allyl glycidyl ether. Among these alkylene oxides, the preferred are propylene oxide, ethylene oxide or a mixture thereof. In reacting both of these materials, dicarboxylic anhydride and alkylene oxide, reaction conditions of the conventional esterification in an addition reaction can be applied.

The desired unsaturated polyester can be obtained, for example, by mixing the above reaction product of a dicarboxylic acid and dicyclopentadiene with a dicarboxylic acid anhydride, keeping the mixture in the fused state, allowing, if necessary, a catalyst such as compounds of metals such as zinc, tin and manganese, exemplified by zinc acetate, zinc octanoate, etc, to exist in the fused mixture, and continuously introducing alkylene oxide into the mixture in the oxygen-free atmosphere and under atmospheric pressure or slightly elevated pressure, while maintaining the reaction temperature at 120° to 250° C., preferably 170° to 230° C., until acid value of the reaction product reaches a level of 5 mg KOH/g to 70 mg KOH/g, preferably 10 mg KOH/g to 50 mg KOH/g, followed by heating at a temperature of about 150° to 250° C. for 2 to 5 hours, if necessary, to thereby allow the reaction to complete.

This reaction, moreover, can be conducted in such a manner as to take out of the reaction system immediately all or part of the unreacted alkylene oxide having passed through the reaction system, whereby the alkylene oxide taken out of the reaction system, if necessary, may be circulated by introducing it again into the reaction system and taking the unreacted one out of the system. The unsaturated polyesters obtained by such procedure can be formed into unsaturated polyester resin compositions by dissolving them in styrene, chlorostyrene, vinyltoluene, divinylbenzene, alkyl acrylates and methacrylates having not more than 6 carbon atoms, vinyl acetate, vinyl propionate and vinyl pivalate, allyl phthalate, triallyl cyanurate and 1,3-butanediol dimethacrylate having polymerization inhibitors such as paratertiary-butylcatechol, hydroquinone monomethyl or monoethyl ether, benzoquinone and hydroquinone dissolved therein in advance.

The unsaturated polyester resin compositions thus obtained are cured by the conventional procedures to thereby form into molded articles. The cured resin obtained by using unsaturated polyester of the present invention has well balanced properties of mechanical strength such as toughness and charpy impact strength, and boiling-water resistance, compared with the cured resin which is prepared by a conventional condensation method using similar materials to those of the present invention.

Given below are the examples to illustrate the present invention, wherein the term "part" denotes part by weight.

EXAMPLE 1

A 294 part portion of maleic anhydride was reacted with 54 parts of water and 396 parts of dicyclopentadiene under nitrogen atmosphere at 110° C. for 4 hours. Acid value of the reaction product at this time was 226 mg KOH/g. To the mixture were added 589 parts of maleic anhydride, 889 parts of phthalic anhydride and 1.8 parts of zinc acetate, and, after the reaction temperature was elevated to 150° C., 871 parts of propylene oxide was gradually added over a 2-hour period in such a way as to maintain the reaction temperature at 200° C., thereby producing an unsaturated polyester with acid value of 30 mg KOH/g. 3094 parts of the unsaturated polyester thus obtained was dissolved in 1666 parts of styrene having 0.3 part of benzoquinone dissolved in advance to thus yield the unsaturated polyester resin (A).

EXAMPLE 2

A 441 part portion of maleic anhydride was reacted with 81 parts of water and 792 parts of dicyclopentadiene under nitrogen atmosphere at 110° C. for 3 hours, thereby producing a reaction product with acid value of 192 mg KOH/g. To the product were added 441 parts of maleic anhydride and 889 parts of phthalic anhydride, and, after the temperature was elevated to 150° C., 784 parts of propylene oxide was gradually added over a period of 1.5 hour in such a manner as to maintain the reaction temperature at 210° C., whereby the acid value reached 50 mg KOH/g. Further continued reaction at 220° C. for 3 hours afforded an unsaturated polyester with acid value of 35 mg KOH/g. A 3428 part portion of the unsaturated polyester thus obtained was dissolved in 1846 parts of styrene having 0.3 part of benzoquinone dissolved in advance to thus yield the unsaturated polyester resin (B).

EXAMPLE 3

In place of 871 parts of propylene oxide in Example 1, 661 parts of ethylene oxide was gradually added over a 1.5 hour period, thereby producing an unsaturated polyester with acid value of 28 mg KOH/g. A 2884 part portion of the unsaturated polyester thus obtained was dissolved in 1553 parts of styrene having 0.3 part of benzoquinone dissolved in advance to thus yield the unsaturated polyester resin (C).

EXAMPLE 4

A 444 part quantity of phthalic anhydride was reacted with 54 parts of water and 396 parts of dicyclopentadiene under nitrogen atmosphere at 110° C. for 5 hours. Acid value of the reaction product at that time was 188 mg KOH/g. To the product were added 883 parts of maleic anhydride, 445 parts of phthalic anhydride and 1.8 parts of zinc acetate, and, after the temperature was elevated to 150° C., 871 parts of propylene oxide was gradually added over a 2-hour period in such a manner as to maintain the reaction temperature at 200° C., thereby producing an unsaturated polyester with acid value of 30 mg KOH/g. A 3094 part portion of the unsaturated polyester thus obtained was dissolved in 1666 parts of styrene having 0.3 part of benzoquinone dissolved in advance to thus yield an unsaturated polyester resin. The cured product of this resin was found to exhibit mechanical strength and boiling water resistance nearly equal to those of the cured resin (A).

EXAMPLE 5

A 498 part quantity of isophthalic acid was reacted with 396 parts of dicyclopentadiene in nitrogen atmosphere at 155° C. for 10 hours (acid value of 188 mg KOH/g). To the reaction mixture were added 883 parts of maleic anhydride and 445 parts of phthalic anhydride, followed by adding 1.8 parts of zinc acetate. After the temperature was elevated to 150° C., 871 parts of propylene oxide was gradually added over a 4-hour period in such a manner as to maintain the reaction temperature at 200° C., thereby producing an unsaturated polyester with acid value of 25 mg KOH/g. A 3092 part portion of the unsaturated polyester was dissolved in 1670 parts of styrene having 0.3 part of benzoquinone dissolved in advance to thus yield the unsaturated polyester resin (D).

EXAMPLE 6

A 294 part portion of maleic anhydride was reacted with 54 parts of water and 396 parts of dicyclopentadiene under nitrogen atmosphere at 110° C. for 4 hours. Acid value of the reaction product at this time was 226 mg KOH/g. To the mixture were added 589 parts of maleic anhydride, 889 parts of phthalic anhydride and 1.8 parts of zinc acetate, and, after the reaction temperature was elevated to 150° C., a mixture of 436 parts of propylene oxide and 331 parts of ethylene oxide was gradually added to the reaction product over a 1.5 hour period maintaining the reaction temperature at 200° C., thereby producing an unsaturated polyester with acid value of 24 mg KOH/g. A 2989 part portion of the unsaturated polyester thus obtained was dissolved in 1800 parts of styrene having 0.3 part of benzoquinone dissolved in advance to thus yield the unsaturated polyester resin.

EXAMPLE 7

A mixture of 883 parts of maleic anhydride, 889 parts of phthalic anhydride and 396 parts of dicyclopentadiene was heated up to 70° C. To the mixture was added 54 parts of water, which caused ring-opening reactions of the maleic anhydride and/or phthalic anhydride. The temperature of the reaction mixture then reached 120° C. The mixture was further heated for one hour at 120° C. to give a reaction product having an acid value of 379 mg KOH/g by the reaction of maleic acid and/or phthalic acid with dicyclopentadiene. To the reaction product thus obtained was added 1.8 parts of zinc acetate. The reaction mixture was heated up to 150° C., and then 871 parts of propylene oxide was gradually added keeping the temperature at 200° C. over a period of 2 hours, whereby the unsaturated polyester having an acid value of 30 mg KOH/g was obtained. In a similar manner to that in Example 1, 3094 parts of the unsaturated polyester thus obtained was dissolved in 1666 parts of styrene in which 0.3 parts of benzoquinone had previously been dissolved, thereby to obtain unsaturated polyester resin. The mechanical strength, boiling-water resistance and other properties of the cured resin were substantially the same as those of the resin (A) as described hereinbefore.

Reference Example 1

Heated up to 150° C. in nitrogen atmosphere were 186 parts of ethylene glycol, 883 parts of maleic anhydride, 888 parts of phthalic anhydride and 1.9 part of zinc acetate, to which 872 parts of propylene oxide was gradually added while maintaining the reaction temperature at 200° C., thereby producing an unsaturated polyester with acid value of 30 mg KOH/g. A 2829 part portion of the unsaturated polyester thus obtained was dissolved in 1523 parts of styrene having 0.3 part of benzoquinone dissolved in advance to thus yield the unsaturated polyester resin (E).

REFERENCE EXAMPLE 2

A 294 part quantity of maleic anhydride was reacted with 54 parts of water and 396 parts of dicyclopentadiene under nitrogen atmosphere at 110° C. for 4 hours. To the reaction product (acid value of 226 mg KOH/g) were added 589 parts of maleic anhydride, 889 parts of phthalic anhydride and 1141 parts of propylene glycol, and the mixture was allowed to undergo a condensation reaction at 200° C. for 10 hours, thereby producing an unsaturated polyester with acid value of 30 mg KOH/g. At that time, 30 parts of an oily material, being accompanied by 270 parts of the condensation water, distilled off. The oily fraction emitted a markedly offensive odor peculiar to dicyclopentadiene. 3063 parts of the unsaturated polyester thus obtained was dissolved in 1654 parts of styrene having 0.3 part of benzoquinone dissolved in advance to thus yield the unsaturated polyester resin (F).

Table 1 shows typical physical properties and JIS ambient-temperature curing characteristics (JIS K6901) of the unsaturated polyester resins (A), (B), (C), (D), (E) and (F) as obtained in the above. Table (II) indicates the boiling-water immersion test results for cast-molded plates prepared by curing 100 parts of each of the above resins by use of 0.3 part of 6% cobalt naphthenate and 0.5 part of 55% methyl ethyl ketone peroxide, followed by post-curing at 100° C. for 3 hours. Table (III) illustrates the surface tackiness of FRP laminated plates which were fabricated by adding for dispersion 0.5 part of 6% cobalt naphthenate and 1.0 part of Aerosil #200 to 100 parts of each of the above resins, adding then 1.0 part of methyl ethyl ketone peroxide for mixing, and conducting a hand lay-up molding at 23 to 25° C. by the conventional procedure with the use of chopped strand glass mats (#450 g/m$^2$) to a glass content of 30 to 33 weight %, followed by curing, and their physical properties after post-curing at 100° C. for 2 hours.

TABLE (I)

Properties and JIS Ambient-temperature curing characteristics of the Resins

| | | Resin | | | | | |
|---|---|---|---|---|---|---|---|
| | | (A) | (B) | (C) | (D) | (E) | (F) |
| Appearance | | clear | clear | clear | clear | clear | clear |
| Viscosity (cps) | | 360 | 320 | 330 | 390 | 340 | 370 |
| Color tone (Gardner) | | 4 | 4 | 4 | 4 | 3 | 4 |
| Curing Characteristics at 25° C. | Gel time | 7'00" | 6'50" | 7'20" | 7'40" | 7'30" | 7'20" |
| | Time to peak exotherm temperature | 26'50" | 27'30" | 27'00" | 28'00" | 30'00" | 27'00" |
| | at exothermic peak | 138° C. | 134° C. | 140° C. | 141° C. | 142° C. | 139° C. |

TABLE (II)

Boiling-water immersion test for cast-molded plates

| | Resin | | | | | |
|---|---|---|---|---|---|---|
| | (A) | (B) | (C) | (D) | (E) | (F) |
| A period to formation of microcracks in boiling-water immersion test | 120 hrs | 140 hrs | 110 hrs | 250 hrs | 60 hrs | 120 hrs |

TABLE (III)

Surface tackiness and physical properties of FRP laminated plates

| | Resin | | | | | |
|---|---|---|---|---|---|---|
| | (A) | (B) | (C) | (D) | (E) | (F) |
| Surface state of the plate kept standing about 1 hour at room temperature after gellation | not tacky | not tacky | not tacky | not tacky | tacky | not tacky |
| Tensile strength (kg/mm$^2$) | 6.0 | 6.3 | 6.1 | 7.0 | 5.5 | 4.5 |
| Tensile modulus (kg/mm$^2$) | 420 | 430 | 420 | 450 | 400 | 410 |
| Elongation (%) | 1.8 | 1.9 | 1.8 | 2.0 | 1.7 | 0.6 |
| Flexural strength (kg/mm$^2$) | 12 | 13 | 11 | 14 | 10 | 8 |
| Flexural modulus (kg/mm$^2$) | 450 | 460 | 440 | 460 | 420 | 440 |
| Charpy impact $\left(\frac{kg \cdot cm}{cm^2}\right)$ | 3.40 | 3.45 | 3.38 | 3.50 | 3.30 | 1.42 |

What is claimed is:

1. A process for producing an unsaturated polyester, which comprises reacting dicarboxylic acid anhydride with alkylene oxide in the presence of a reaction product of dicarboxylic acid and dicyclopentadiene.

2. A process as claimed in claim 1, wherein the dicarboxylic acid anhydride is a mixture of α,β-unsaturated dicarboxylic acid anhydride and dicarboxylic acid anhydride other than the α,β-unsaturated dicarboxylic acid anhydride.

3. A process as claimed in claim 2, wherein the mixture is the one consisting of maleic anhydride and phthalic anhydride.

4. A process as claimed in claim 1, wherein the alkylene oxide is propylene oxide, ethylene oxide or a mixture thereof.

5. A process as claimed in claim 4, wherein the alkylene oxide is propylene oxide.

6. A process as claimed in claim 1, wherein the carboxylic acid is maleic acid, phthalic acid, isophthalic acid or a mixture thereof.

7. A process as claimed in claim 1, wherein the carboxylic acid is maleic acid.

8. A process as claimed in claim 1, wherein the carboxylic acid is maleic acid or a mixture of maleic acid and phthalic acid.

9. A process as claimed in claim 1, wherein the ratio of carboxylic acid to dicyclopentadiene is in the range from the equipmolar proportion to double the equimolar proportion of either one of these components to the other.

10. A process as claimed in claim 1, wherein the reaction product of dicarboxylic acid and dicyclopentadiene is employed in the proportion of 2 parts to 200 parts against 100 parts of the total weight of dicarboxylic acid anhydride and alkylene oxide.

11. A process as claimed in claim 1, wherein the unsaturated polyester is the one having an acid value of 5 mg KOH/g to 70 mg KOH/g.

* * * * *